United States Patent
Li et al.

(10) Patent No.: US 9,574,553 B2
(45) Date of Patent: Feb. 21, 2017

(54) SOLAR-POWERED APPARATUS

(75) Inventors: Tongqiang Li, Zhejiang (CN); Xiaoning Jiang, Zhejiang (CN)

(73) Assignee: ZHEJIANG GONGSHANG UNIVERSITY (CN)

( * ) Notice: Subject to any disclaimer, the term of this patent is extended or adjusted under 35 U.S.C. 154(b) by 0 days.

(21) Appl. No.: 13/991,683

(22) PCT Filed: Jun. 21, 2012

(86) PCT No.: PCT/CN2012/077388
§ 371 (c)(1),
(2), (4) Date: Jun. 5, 2013

(87) PCT Pub. No.: WO2013/044653
PCT Pub. Date: Apr. 4, 2013

(65) Prior Publication Data
US 2014/0223905 A1 Aug. 14, 2014

(30) Foreign Application Priority Data
Sep. 29, 2011 (CN) .......................... 2011 1 0291099

(51) Int. Cl.
*F03G 7/06* (2006.01)
*F03G 6/00* (2006.01)

(52) U.S. Cl.
CPC ................ *F03G 7/065* (2013.01); *F03G 6/00* (2013.01); *Y02E 10/46* (2013.01)

(58) Field of Classification Search
CPC .................................. F03G 7/06; F03G 7/065
USPC ................................................... 60/527–529
See application file for complete search history.

(56) References Cited

U.S. PATENT DOCUMENTS

| | | | | |
|---|---|---|---|---|
| 1,258,368 A * | 3/1918 | Smith | .............................. | 60/529 |
| 2,197,125 A * | 4/1940 | Cox | ................................. | 60/588 |
| 2,967,249 A * | 1/1961 | Quirk | ............................ | 250/215 |
| 3,430,441 A * | 3/1969 | Adams | ....................... | F03G 7/06 60/529 |
| 3,913,326 A * | 10/1975 | Banks | ..................... | F03G 7/065 60/527 |
| 4,030,298 A * | 6/1977 | Sandoval | ................ | F03G 7/065 60/527 |
| 4,037,411 A * | 7/1977 | Hochstein | ............... | F03G 7/065 60/527 |
| 4,055,956 A * | 11/1977 | Matovich, Jr. | .................. | 60/527 |
| 4,383,797 A * | 5/1983 | Lee | ........................ | F03B 17/062 405/22 |
| 4,490,976 A * | 1/1985 | Johnson | .................. | C22F 1/006 60/527 |
| 6,647,725 B1* | 11/2003 | Letovsky | ..................... | 60/641.6 |
| 2011/0120115 A1* | 5/2011 | Alexander et al. | ............. | 60/527 |

(Continued)

FOREIGN PATENT DOCUMENTS

JP    WO 8201400 A1 *  4/1982  .............. F03G 3/00

*Primary Examiner* — Thomas Denion
*Assistant Examiner* — Laert Dounis

(57) ABSTRACT

The invention relates to a solar-powered apparatus, comprising a housing (1), a shield panel (5) disposed on the housing (1), and a transmission apparatus (2) disposed inside the housing (1). The transmission apparatus (2) is provided with eight or more memory alloy sheets (3). The housing (1) is also provided with a ratchet pawl (13). The shield panel (5) is provided with a light-focusing apparatus (51) used for focusing light. The apparatus is capable of converting solar energy into mechanical energy.

8 Claims, 1 Drawing Sheet

(56) References Cited

U.S. PATENT DOCUMENTS

2011/0179790 A1\* 7/2011 Pretorius .................... 60/641.15
2012/0216524 A1\* 8/2012 Browne ................. F03G 7/065
　　　　　　　　　　　　　　　　　　　　　　60/527

\* cited by examiner

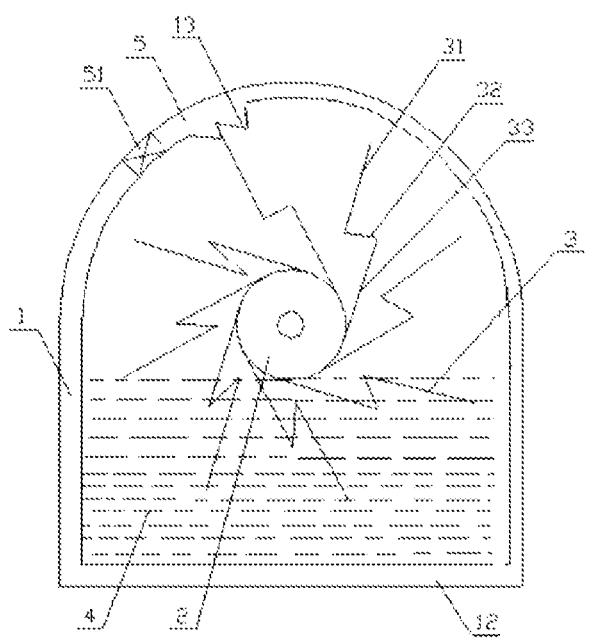

SOLAR-POWERED APPARATUS

TECHNICAL FIELD OF THE INVENTION

The invention relates to an apparatus for converting solar energy into kinetic energy, and in particular, to a solar-powered apparatus.

BACKGROUND OF THE INVENTION

With the development of the world economy, the consumption of energy increases greatly. For the moment, because of the serious imbalance between supply and demand, the price of energy, mainly petroleum, has surged, which affects and involves the economic development around the world, and brings extreme risk for worldwide economic development. Therefore, people become committed to developing and utilizing new energy. As a new kind of clean and renewable energy, solar energy has been receiving more and more recognition.

SUMMARY OF THE INVENTION

In view of the defects in the prior art that traditional energy like petroleum is in shortage and has seriously environmental pollution, and the utilization rate of solar energy in a unit area for common solar energy installations is low, the invention provides a solar-powered apparatus, which effectively converts solar energy into kinetic energy to output by using the memory function of memory alloy, and which has the advantages of simple structure and high utilization rate of solar energy in a unit area.

In order to solve the above technical problems, the invention is realized through the following technical solutions.

A solar-powered apparatus is provided, comprising a housing, a shield panel disposed on the housing, and a transmission apparatus disposed inside the housing, the transmission apparatus is provided with eight or more alloy sheets, and the housing is further provided with a ratchet pawl; and the shield panel is provided with a light-focusing apparatus for focusing light.

The transmission apparatus is disposed inside the housing and connected with the alloy sheets, thereby preventing external impurities from entering into the transmission apparatus, reducing the wear of the transmission apparatus, and prolonging the service life of the device.

Preferably, each of the alloy sheets is a panel bent by rotating anticlockwise by 90° or more to form a first bent panel and a second bent panel, the second bent panel is further bent by rotating clockwise by 90° or more to form a third bent panel, and planes where the first bent panel and the third bent panel obtained by bending the alloy sheet are located are parallel to each other. Each of the alloy sheets is made of memory alloy and folded twice, so the alloy sheet will restore to the original straight state after heated by light. The alloy sheet is shielded by the shield panel at the upper part of the housing and acts on the shield panel during the stretching process, and meanwhile, the shield panel provides the alloy sheet a reacting force to drive the alloy sheet to rotate. When lots of alloy sheets work successively, qualitative change comes out of quantitative change, so that the alloy sheets are promoted to drive the transmission apparatus to rotate.

Preferably, each of the alloy sheets is in fixed connection with the transmission apparatus, and the first bent panel of the alloy sheet is tangent to a circle of the transmission apparatus formed by axial projection. The alloy sheet is tangent to the transmission apparatus, so the alloy sheet acts on the shield panel when extending after heated. After squeezed by the alloy sheet, the shield panel provides a reacting force to the alloy sheet to generate a torque, so as to drive the transmission apparatus to rotate. A curved elbow is provided at an end of the alloy sheet. Since the alloy sheet is made of memory alloy, the folded alloy sheet has a "memory" function, and will be naturally unfolded after heated by light to restore to the original straight state. After the curved elbow contacts and acts with the shield panel at the upper part of the housing during the restoration process, the shield panel provides a reacting force to the curved elbow on the alloy sheet to drive the alloy sheet to rotate.

Preferably, the shield panel contacting the alloy sheets which expand after heated is at the upper part of the housing, and a solution tank for containing coolant is at the lower part of the housing.

Preferably, each of the alloy sheets is made of memory alloy. The memory alloy is a kind of martensitic phase transition alloy with regular atomic arrangement and volume variance less than 0.5%. This kind of alloy may have deformation due to external force, and may restore to the original shape at a certain temperature when the external force is canceled. It is called "memory alloy" because it has a function of restoration over millions of times. Of course, it cannot think or remember like a human brain, so it should be called "shape memory alloy" more precisely. In addition, the memory alloy further has the advantages of non-magnetism, wear-resistance and corrosion-resistance, and non-toxicity, so it is widely applied. The alloy sheet is made of titanium-nickel alloy, gold-cadmium alloy, or copper-zinc alloy.

Preferably, the transmission apparatus comprises a rotating shaft, and the alloy sheets are in fixed connection with the rotating shaft. The transmission apparatus comprises a rotating shaft. Since the alloy sheets are in fixed connection with the rotating shaft, when rotating, lots of alloy sheets will drive the rotating shaft to rotate, so as to output energy generated by the alloy sheets through the rotating shaft.

Preferably, the ratchet pawl is disposed on the inner wall of the shield panel, the radial length of each bent alloy sheet is smaller than the distance from the shield panel to the transmission apparatus, and the radial length of the alloy sheet when stretching after heated is larger than the distance from the shield panel to the transmission apparatus; and the depth of the solution tank is larger than the radial length of the alloy sheet when stretching after heated. The ratchet pawl is disposed on the inner wall of the shield panel, sunlight is incident into the housing via the light-focusing apparatus and irradiates on the alloy sheets inside the housing, so that the alloy sheets stretch after heated and drive the transmission apparatus to rotate. The depth of the solution tank is larger than the radial length of the alloy sheets when stretching after heated, so the alloy sheets may be wholly submerged in the solution tank without contacting the inner wall of the solution tank.

Preferably, there are two or more alloy sheets which are evenly distributed on the transmission apparatus by taking a geometric center of the transmission apparatus as a center.

The sunlight may be incident into the housing with a largest transmittance by disposing a light-focusing mirror, so the reflection of external sunlight is reduced and the refraction of sunlight is increased. Meanwhile, the alloy sheets are coated with a light absorbing film, thus heat of sunlight is effectively absorbed and the utilization efficiency of solar energy is improved.

The solar-powered apparatus converts solar energy into kinetic energy to output by using the memory function of memory alloy, and has the advantages of simple structure and high utilization rate of solar energy in a unit area. The energy generated is clean and renewable. The solar-powered apparatus has great significance in protection of the environment and development and utilization of new energy.

BRIEF DESCRIPTION OF THE DRAWINGS

FIG. 1 is a structure diagram of Embodiment 1 of the invention.

In the figure: 1—Housing; 2—Transmission apparatus; 3—Alloy sheet; 4—Coolant; 5—Shield panel; 12—Solution tank; 13—Ratchet pawl; 31—First bent panel; 32—Second bent panel; 33—Third bent panel; 51—Light-focusing apparatus

DETAILED DESCRIPTION OF THE INVENTION

The invention will be further described in details as below by particular embodiments with reference to FIG. 1.

Embodiment 1

A solar-powered apparatus, as shown in FIG. 1, comprises a housing 1, a shield panel 5 disposed on the housing 1, and a transmission apparatus 2 disposed inside the housing 1, the transmission apparatus 2 is provided with eight alloy sheets 3, and the housing 1 is further provided with a ratchet pawl 13; and the shield panel 5 is provided with a light-focusing apparatus 51 for focusing light. The housing 1 is provided with a ratchet pawl 13 having a locking function, so the alloy sheets 3 are capable of rotating clockwise only. When stretching after heated via the light-focusing apparatus 51, the alloy sheets 3 drive the transmission apparatus 2 to rotate clockwise. When rotating clockwise, the transmission apparatus 2 may also drive the alloy sheets 3 disposed on the transmission apparatus 2 to rotate clockwise synchronously. In this way, the whole solar-powered apparatus rotates.

Each of the alloy sheets 3 is a panel bent by rotating anticlockwise by 120° to form a first bent panel 31 and a second bent panel 32. The second bent panel 32 is further bent by rotating clockwise by 120° to form a third bent panel 33. The planes where the first bent panel 31 and the third bent panel 33 obtained by bending the alloy sheet 3 are located are parallel to each other. Each of the alloy sheets 3 is made of memory alloy and folded twice, so the alloy sheets 3 will restore to the original straight state after heated by light. The alloy sheets 3 are shielded by the shield panel 5 at the upper part of the housing 1 and act on the shield panel 5 during the stretching process, and meanwhile, the shield panel 5 provides the alloy sheets 3 a reacting force to drive the alloy sheets 3 to rotate. When lots of alloy sheets 3 work successively, qualitative change comes out of quantitative change, so that the alloy sheets 3 are promoted to drive the transmission apparatus to rotate. The alloy sheets 3 are in fixed connection with the transmission apparatus 2. The first bent panel 31 of each alloy sheet 3 is tangent to a circle of the transmission apparatus 2 formed by axial projection. The alloy sheets are tangent to the transmission apparatus, so the alloy sheets act on the shield panel when stretching after heated. After squeezed by the alloy sheets, the shield panel provides a reacting force to the alloy sheets to generate a torque, so as to drive the transmission apparatus to rotate.

The shield panel 5 contacting the alloy sheets 3 which stretch after heated is at the upper part of the housing 1, and a solution tank 12 for containing coolant 4 is at the lower part of the housing 1. When rotating to the lower half part of the housing 1, the alloy sheets 3 contact the coolant 4 inside the solution tank 12. The alloy sheets 3 restore to the original bent state by the cooling of the coolant 4. The alloy sheets 3 are made of memory alloy, for example, titanium-nickel alloy.

The ratchet pawl 13 is disposed on the inner wall of the shield panel 5. The radial length of the bent alloy sheets 3 is smaller than the distance from the shield panel 5 to the transmission apparatus 2, and the radial length of the alloy sheets 3 when stretching after heated is larger than the distance from the shield panel 5 to the transmission apparatus 2. The depth of the solution tank 12 is larger than the radial length of the alloy sheets 3 when stretching after heated.

The ratchet pawl 13 is disposed on the inner wall of the shield panel 5, sunlight is incident into the housing 1 through the shield panel 5 and irradiates on the alloy sheets 3 inside the housing 1, so that the alloy sheets 3 stretch after heated and drives the transmission apparatus 2 to rotate.

The transmission apparatus 2 comprises a rotating shaft, and the alloy sheets 3 are in fixed connection with the rotating shaft. The transmission apparatus 2 comprises a rotating shaft. Since the alloy sheets 3 are in fixed connection with the rotating shaft, when rotating, lots of alloy sheets 3 drive the rotating shaft to rotate, so as to output energy generated by the alloy sheets 3 through the rotating shaft. There are eight or more alloy sheets 3 which are evenly distributed on the transmission apparatus 2 by taking the geometric center of the transmission apparatus 2 as a center.

A heat absorbing film is plated on the inner wall of the housing 1. The light-focusing apparatus 51 is a convex lens having a light-focusing function. Meanwhile, the light-focusing apparatus 51 for focusing light, which preferably is a light-focusing glass mirror, is disposed on the housing 1. Therefore, sunlight may be directly incident into the housing 1 through the shield panel 5 and directly irradiates on the alloy sheets 3, so that the alloy sheets stretch after heated. The sunlight may be incident into the housing 1 with a largest transmittance by disposing the light-focusing mirror, so the reflection of external sunlight is reduced and the refraction of sunlight is increased. Meanwhile, the possibility of reflecting light rays outside from the housing 1 by multiple times of reflection is reduced. Further, because the heat absorbing film is plated on the inner wall of the housing 1, and the heat absorbing film increases the roughness of the inner wall of the housing 1, light rays incident into the housing 1 are diffusely reflected, thereby greatly reducing the emission of sunlight. Meanwhile, the alloy sheets are coated with a light absorbing film, heat of sunlight is thus effectively absorbed and the utilization efficiency of solar energy is improved.

In the condition of sunlight irradiation, the memory alloy sheets 3 will expand after heated under the action of the light-focusing apparatus 51. The expanded alloy sheets 3 are bound to stretch to squeeze the metal housing 1. The metal housing 1 will not have deformation because of squeezing as it is made of extremely hard metal. On the contrary, the housing 1 will provide the memory alloy sheets 3 a reacting force which acts on the rotating shaft connected with the transmission apparatus by the memory alloy sheets 3, so as to drive the rotating shaft to rotate. The metal housing 1 is an apparatus in such a structure that the radius of the upper half part is small while the radius of the lower half part is large. When rotating to the bottom, the memory alloy sheets 3 will be submerged in the metal coolant 4, so that the memory alloy sheets will contract. This makes preparation for the second expansion after heated. In this way, in the condition of sunlight irradiation, the rotating shaft connected with the transmission apparatus rotates continuously to bring continuous power for the transmission apparatus.

Embodiment 2

A solar-powered apparatus, as shown in FIG. 1, comprises a housing 1, a shield panel 5 disposed on the housing 1, and a transmission apparatus 2 disposed inside the housing 1, the transmission apparatus 2 is provided with sixteen alloy sheets 3, and the housing 1 is further provided with a ratchet pawl 13; and the shield panel 5 is provided with a light-focusing apparatus 51 for focusing light. The housing 1 is provided with a ratchet pawl 13 having a locking function, and so the alloy sheets 3 are capable of rotating clockwise only. When stretching after heated via the light-focusing apparatus 51, the alloy sheets 3 drive the transmission apparatus 2 to rotate clockwise. When rotating clockwise, the transmission apparatus 2 may also drive the alloy sheets 3 disposed on the transmission apparatus 2 to rotate clockwise together. In this way, the whole solar-powered apparatus rotates.

Each of the alloy sheets 3 is a panel bent by rotating anticlockwise by 160° to form a first bent panel 31 and a second bent panel 32. The second bent panel 32 is further bent by rotating clockwise by 160° to form a third bent panel 33. The planes where the first bent panel 31 and the third bent panel 33 obtained by bending the alloy sheet 3 are located are parallel to each other. The alloy sheets 3 are made of memory alloy and folded three times, so the alloy sheet 3 will restore to the original straight state after heated by light. The alloy sheets 3 is shielded by the shield panel 5 at the upper part of the housing 1 and act on the shield panel 5 during the stretching process, and meanwhile, the shield panel 5 provides the alloy sheets 3 a reacting force to drive the alloy sheets 3 to rotate. When lots of alloy sheets 3 work successively, qualitative change comes out of quantitative change, so that the alloy sheets 3 are promoted to drive the transmission apparatus to rotate. The alloy sheets 3 are in fixed connection with the transmission apparatus 2. The first bent panel 31 of each alloy sheet 3 is tangent to a circle of the transmission apparatus 2 formed by axial projection. The alloy sheets are tangent to the transmission apparatus, so the alloy sheets act on the shield panel when stretching after heated. After squeezed by the alloy sheets, the shield panel provides a reacting force to the alloy sheets to generate a torque, so as to drive the transmission apparatus to rotate. A curved elbow is provided at an end of the alloy sheets 3 close to the housing 1. A curved elbow is provided at the end of the alloy sheets 3. Since the alloy sheets 3 are made of memory alloy, the folded alloy sheets 3 have a "memory" function, and will be naturally unfold after heated by light to restore to the original straight state. After the curved elbow contacts and acts with the shield panel 5 at the upper part of the housing 1 during the restoration process, the shield panel 5 provides a reacting force to the curved elbow on the alloy sheets 3, so as to drive the alloy sheet 3 to rotate.

The shield panel 5 contacting the alloy sheets 3 which stretch after heated is at the upper part of the housing 1, and a solution tank 12 for containing coolant 4 is at the lower part of the housing 1. When rotating to the lower half part of the housing 1, the alloy sheets 3 contact the coolant 4 inside the solution tank 12. The alloy sheets 3 restore to the original bending state by the cooling of the coolant 4. The alloy sheets 3 are made of memory alloy, for example, copper-zinc alloy.

The transmission apparatus 2 comprises a rotating shaft, and the alloy sheets 3 are in fixed connection with the rotating shaft. The transmission apparatus 2 comprises a rotating shaft. Since the alloy sheets 3 are in fixed connection with the rotating shaft, when rotating, lots of alloy sheets 3 drive the rotating shaft to rotate, so as to output energy generated by the alloy sheets 3 through the rotating shaft.

There are sixteen or more alloy sheets 3 which are evenly distributed on the transmission apparatus 2 by taking a geometric center of the transmission apparatus 2 as a center. A heat absorbing film is plated on the inner wall of the housing 1. Further, the light-focusing apparatus 51 for focusing light, which preferably is a light-focusing glass mirror, is disposed on the housing 1. Therefore, sunlight may be directly incident into the housing 1 through the shield panel 5 and directly irradiates on the alloy sheets 3, so that the alloy sheets stretch after heated. The sunlight may be incident into the housing 1 with a largest transmittance by disposing the light-focusing apparatus 51, so the reflection of external sunlight is reduced and the refraction of sunlight is increased. Meanwhile, the possibility of reflecting light rays outside from the housing 1 by multiple times of reflection is reduced. Further, because the heat absorbing film is plated on the inner wall of the housing 1, and the heat absorbing film increases the roughness of the inner wall of the housing 1, light rays incident into the housing 1 are diffusely reflected, thereby greatly reducing the emission of sunlight. Meanwhile, the alloy sheets are coated with a light absorbing film, heat of sunlight is thus effectively absorbed and the utilization efficiency of solar energy is improved.

In short, the above contents just describe the preferred embodiments of the invention. Any equivalent changes and modifications done within the patent scope of the application, for example, the position where the light-focusing apparatus 51 is disposed on the housing 1 may be varied as long as the alloy sheets 3 may have deformation after heated, should fall into the protection scope of the invention.

What is claimed is:

1. A solar-powered apparatus, comprising:
a housing (1),
a shield panel (5) disposed on the housing (1) and comprising a ratchet pawl and a light-focusing apparatus configured for focusing light, and
a transmission apparatus (2) disposed inside the housing (1), comprising eight or more alloy sheets, wherein each of the alloy sheets is a panel bent in a first direction to form a first bent panel and a second bent panel and wherein the second bent panel is further bent in the opposite direction to form a third bent panel,
wherein the ratchet pawl contacts alloy sheets expanded by heating at an upper part of the housing (1), and further comprising a solution tank containing coolant arranged at a lower part of the housing (1),
wherein the ratchet pawl (13) is disposed on an inner wall of the shield panel (5), a radial length of each alloy sheet (3) is smaller than a distance from the inner wall of the shield panel to the transmission apparatus, and the radial length of each alloy sheet (3) when expanded by heating is larger than the distance from the inner wall of the shield panel (5) to the transmission apparatus (2); and a depth of the solution tank (12) is larger than the radial length of each alloy sheet (3) when expanded by heating.

2. The solar-powered apparatus according to claim 1, wherein the alloy sheets (3) are coated with a light absorbing film (34).

3. The solar-powered apparatus according to claim 1, wherein each of the alloy sheets (3) is a panel bent by rotating anticlockwise by 90° or more to form the first bent panel (31) and the second bent panel (32), and the second bent panel (32) is further bent by rotating clockwise by 90° or more to form the third bent panel (33), such that planes of the first bent panel (31) and the third bent panel (33).

4. The solar-powered apparatus according to claim 3, wherein each of the alloy sheets (3) is in fixed connection with the transmission apparatus (2), and the first bent panel (31) of each alloy sheet (3) is tangent to a circle of the transmission apparatus.

5. The solar-powered apparatus according to claim 1, wherein each of the alloy sheets (3) is made of memory alloy.

6. The solar-powered apparatus according to claim 1, wherein the transmission apparatus (2) comprises a rotating shaft and the alloy sheets (3) are in fixed connection with the rotating shaft.

7. The solar-powered apparatus according to claim 1, wherein the alloy sheets are evenly distributed on the transmission apparatus with respect to a geometric center of the transmission apparatus (2) as a center.

8. The solar-powered apparatus of claim 1, wherein the light- focusing apparatus comprises at least one of a convex lens and a light-focusing glass mirror.

\* \* \* \* \*